April 12, 1966    A. S. GREGORY ET AL    3,245,869
TREE BARK FIBER AND PROCESS FOR ITS PREPARATION
Filed Nov. 30, 1962
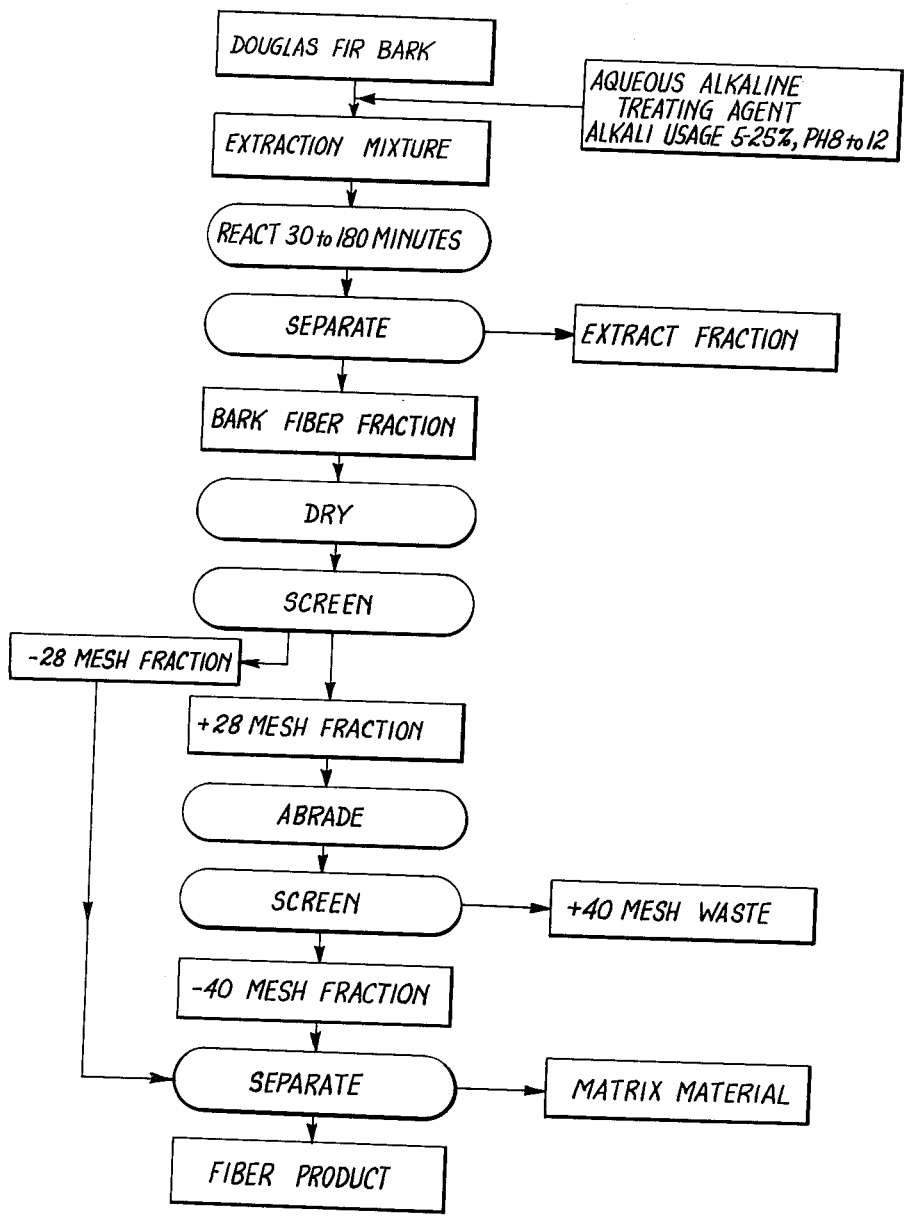
INVENTORS
ARTHUR S. GREGORY
BY DONALD F. ROOT
EDWIN H. GYGI
ATTORNEYS

United States Patent Office

3,245,869
Patented Apr. 12, 1966

3,245,869
TREE BARK FIBER AND PROCESS FOR ITS
PREPARATION
Arthur S. Gregory, Tacoma, and Donald F. Root and Edwin H. Gygi, Longview, Wash., assignors to Weyerhaeuser Company, Tacoma,, Wash., a corporation of Washington
Filed Nov. 30, 1962, Ser. No. 241,154
8 Claims. (Cl. 162—55)

The present invention relates to a chemically treated tree bark fiber product and to a process for its preparation.

In particular it relates to a process for chemically and mechanically preparing bast fibers of Douglas fir bark which has a substantial content of fibers intimately commingled with other constituents. Thus Douglas fir bark contains a large proportion of bast fibers (sclerenchyma), in a bark structure including also significant amounts of cork and parenchyma.

The parenchyma is a friable phloem tissue consisting principally of sieve tubes. The cork is a spongy, resilient low-density material resembling in appearance and in many of its properties the cork derived from cork oak bark. The bast fibers, termed herein simply "bark fibers," occur in the form of hard needles, approximately cylindrical in shape and usually less than ¼ inch long. As found in the bark they are encrusted with tightly adherent sheaths of amber colored material.

These constituents of the bark are present in varying proportions, determined by the age of the tree, climatic conditions, soil conditions, and other factors. The bark fibers usually are present in the proportion of from 20–50% by weight, dry bark basis. A typical composite sample of Douglas fir bark contains 31% bark fiber, 45% parenchyma and 24% cork.

Various mechanical procedures have been devised for separating the various bark components of the raw bark.

In a typical mechanical procedure, the bark is ground or milled at controlled moisture content to a suitable particle size. It then is fractionated mechanically by screening, winnowing or other procedures which separate it into fractions comprising predominantly bark fiber, parenchyma and cork.

These procedures, while useful for some purposes, nevertheless have been too complex for wide-spread application. In addition, they have not been successful in completely freeing the fibers from the encrusting material. Still further, where the mechanical fractionation has been carried out to the degree necessary to secure relatively pure fractions of individual bark components, the yields have been so small as to render the process impractical.

The prior art chemical procedures for treating bark have relied upon the differential solubility of the bark components in organic solvents, or in aqueous alkaline solutions to extract various components from the bark. However, the extracted bark residue remained as a mixture of extracted original bark components.

The bark constituents sought as products of the foregoing procedures have important potential commercial application. However, the bark fiber fraction produced by mechanical separation, or the bark residue remaining after chemical treatment have certain disadvantages for other commercial applications. As mentioned previously, in attempting to produce a relatively pure bark fiber fraction by mechanical means the yield is so small as to be commercially impractical.

Furthermore the production of such fractions, requiring as they do several steps of grinding and screening is most difficult to control with the result that the final product exhibits varying degrees of purity. Since such a bark fiber fraction contains a high percentage of complex acids and phenolic bodies, a slight variation in the degree of purity will sometimes be sufficient to cause inhibition or to prevent the cure of resin compositions to which they are added as fillers or reinforcing agents. Still further, the encrusting material often prevents effective bonding of the resin to the fiber thereby reducing the strength of the molded resinous product.

The chemically treated bark residue contains fine particles of the original components of the bark including extracted parenchyma and cork particles as well as extracted bark fiber. In some instances wood particles, which adhere to the bark during debarking of the log, may also be present. For many uses it is desirable to separate these components from the bark fiber prior to its incorporation in resinous compositions.

Accordingly, it is the general object of this invention to provide a uniform bark fiber product of reduced phenolic body content, free from adhering encrusting material and associated bark components and having surface qualities rendering it highly suitable for use as a plastic filler and in other important commercial applications.

It is another principal object of this invention to provide a practical, economical process for producing such a uniform bark fiber on a large commercial scale.

The figure shows the flow diagram of the process for producing the uniform bark fiber in accordance with the teachings of this invention.

It has been found that the foregoing objects may be achieved by taking advantage of the discovery that when Douglas fir is subjected first to treatment with an alkaline agent as described herein, several important results ensue. First, a substantial proportion of the bark is dissolved away from the fiber, leaving that important component as a solid residue. Second, a substantial proportion of the phenolic bodies and other alkali soluble constituents of the bark components are extracted from them. Third, the surface of the fibers are cleaned of adhering encrusting material so that they will bond efficiently with various molding resins in which they may be incorporated. Fourth, any associated nonfibrous parenchyma or cork components not removed by the chemical treatment are rendered friable so that they may be removed subsequently by a simple milling and screening or winnowing procedure, leaving behind the hard, clean fibers.

The procedure by which the foregoing results are achieved broadly comprises providing small pieces of Douglas fir bark containing bast fibers encrusted with tightly adherent sheaths of amber colored material and having a native content of phenolic and other alkali soluble materials intimately commingled with other bark constituents. These pieces are treated with aqueous alkaline treating agents such as caustic soda under conditions which remove the adhering encrusting material, render friable the associated commingled parenchyma and cork components and which remove a substantial proportional of the alkali soluble content thereof. The treated bark is separated from the alkaline treating agent and dried to a selected moisture content, preferably less than 15% by weight, dry bark basis, after which it is abraded in a suitable mill for reducing to a powder any residue of associated friable nonfibrous alkaline insoluble material. The abraded product then is subjected to a screening, to remove any agglomerates and wood splinters, followed by an air classification step to separate the non-fibrous powder from the cleaned fibers.

To prepare the raw bark, it first is cleaned, if necessary, after which it is reduced by grinding or milling to a particle size suitable for subsequent processing, i.e., to a particle size volume of ¼ inch cube or less.

The bark then is subjected to a chemical and mechanical treatment in which it is reacted with an aqueous alkaline treating agent broadly comprising a basic acting compound of sodium, potassium or ammonia, e.g., caustic soda, caustic potash, sodium carbonate, potassium carbonate, sodium bicarbonate, borax, ammonium hydroxide and ammonium carbonate. Sodium hydroxide is a preferred extracting agent in view of its efficient action and availability. It preferably is introduced to the system as a concentrated aqueous solution having, for example, a concentration of 50% by weight of caustic soda.

The bark is treated with the alkaline material in either single or multiple stages, either batchwise or continuously, at a pH of from 8–12, with an alkali usage of from 5–25%, and at a consistency of the bark of from 5–40%. Appropriate amounts of water are used to produce these conditions. The treating time is variable, although in general a period of from 30–180 minutes is adequate at a temperature in the range of ambient to the boiling point. However, a preferred temperature range is 140° F. to 212° F.

After the chemical treatment has been completed, the resulting alkaline slurry is withdrawn from the reactor and separated by screening, or otherwise, into an extract fraction and a residual bark fiber fraction. The latter may be washed with hot water or other solvent to free it from any residual content of alkaline extracting agent.

The foregoing treatment serves several important functions. First, it removes substantially all the alkali soluble material from the bark leaving a residue comprising substantially bark fibers. Furthermore, the alkali soluble content of the original fibers has been reduced from a level of about 30% to a level below 5%. This result is accompanied by dissolution of a substantial proportion of the bark substance from the individual fibers, leaving them as a solid residue.

Furthermore, the surfaces of the fibers are cleaned from the adhering encrusting material permitting efficient bonding of the fibers with molding resins on subsequent use.

Still further any accompanying remaining parenchyma or cork material not removed by the chemical treatment is rendered friable so that it may be removed subsequently by simple milling and screening or winnowing procedure, leaving behind hard, clean fibers.

Accordingly, the moist fiber product is fed first into a drier, preferably a rotary flash drier heated to an inlet temperature in the range of 250°–1600° F. depending on the rate of fiber product feed and the desired moisture content of the final product. Here the moisture content of the product is reduced to a value of less than 30% by weight, preferably less than 15% by weight on a total weight basis.

The resulting dried fiber then is passed into a rodmill or other suitable reducing apparatus. The ground product of the rodmill passes into a vibrating screen separator. This fractionates the solid mixture into a discarded fraction, having a particle size of +40 mesh Tyler Standard Sieve Series, and an accepted fraction having a particle size of −40 mesh Tyler Standard Sieve Series.

The latter fraction contains the bark fibers. It is passed into a winnower or air classifier. This unit has for its function the separation of the relatively light dry abraded extracted non-fiber portions of the bark removed from the fibers by the action of the rodmill from the relatively heavy sclerenchyma or bark fiber fraction remaining as a residue.

It may be desirable in some instances to make an initial separation of the dried fiber product on a vibrating screen separator equipped with a screen sized to pass particles having a mesh size or less than about 28 mesh Tyler Standard Sieve Series.

The passed fine fraction is sent directly to the air classifier or winnower while the coarse fraction is sent to the rodmill for processing as herein described.

There thus is obtained as a product of the herein described chemical and mechanical treatment a major proportion of the bast fiber content of the raw bark, substantially free from the other bark constituents. In the case of the Douglas fir, this bark fraction is obtained in yields of from about 70–90% of the fiber in the original bark feed. It is from 80–90% pure, containing but a small amount of the parenchyma and cork constituents of the original bark.

The fiber product has been altered chemically by removal or alteration of its alkali soluble components and by chemical cleaning of encrusting material from its surface. In addition, it has been altered mechanically by separation of substantially all of the individual fibers from each other, from the parenchyma matrixes in which they originally are embedded, and from the accompanying parenchyma and cork particles which remained after chemical treatment.

These changes are visible upon microscopic examination, the fibers being sharply defined and presenting clean surfaces. The changes also are discernible by chemical test since, when the fibers are incorporated in various peroxide-catalyzed resinous molding compositions, they do not materially inhibit the curing rate of the compositions, as do unaltered natural bark fibers.

The presently described process and the characteristics of the bark fiber product obtained thereby are illustrated in the following examples:

*Example I*

Douglas fir bark was reduced to particles in a hammermill having 3/16 inch screen. The ground bark was treated in a continuous countercurrent two stage extraction system with the bark fed into the first stage and an aqueous caustic soda solution having a concentration of 50% by weight together with countercurrent wash liquor fed into the second stage. The temperature maintained in the extraction system was about 200° F. The pH values were 10 in the first stage and 13 in the second stage, while the consistencies were 8% and 7% respectively, and the dwell times were 60 minutes in each stage.

A caustic soda extract product of the bark was produced continuously from the first stage and a treated extracted bark fiber product was produced continuously from the second stage. The bark fiber product was passed over a vibrating screen separator onto a washing horizontal vacuum pan filter and then through a roll press.

The pressed product then was dried to a moisture content of 15% by weight in a rotary drum drier, heated to 450° F. at the inlet. The dried fibers then were fractionated into +28 mesh and −28 mesh fractions by means of a vibrating screen. The −28 mesh fraction was passed to an air classifier while the +28 mesh fraction was passed to a rodmill for further reduction and separation of the accompanying parenchyma and cork components from the bark fiber.

The product from the rodmill was fractionated in a second vibrating screen into a +40 mesh and −40 mesh fractions. The +40 mesh fraction was discarded while the −40 mesh fraction, together with the −28 mesh fraction from the first screen, was fed into an air classifier set to separate the associated reduced material from the bast fiber product. The latter was obtained in a 26% yield, base on the original oven dry bark feed. This represents a yield of 83.9% of the fiber in the original bark feed.

*Example II*

This example illustrates the distinctive properties of the herein described extracted bark fiber product as compared to a solely mechanically separated bark fiber product, when applied as reinforcing fillers in the production of molding compositions.

The mechanical fiber product was prepared in two different runs by grinding whole Douglas fir bark in a hammermill having a 7/16 inch screen, drying to a moisture content of 15% and screening over a 14 mesh screen (Tyler Standard). The —14 mesh fraction was then ballmilled and screened again to remove coarse particles. The remaining fraction was then ground in a high speed hammermill having a ³⁄₃₂ inch screen and then passed through an air separator to remove most of the fines. The coarse fraction from the air separator was then screened and the fraction passing through an 80 mesh but remaining on the 150 mesh screen (Tyler Standard) was compared with the fiber product of this invention in a standard reinforced molding resin formulation as follows:

|  | Parts |
|---|---|
| Fiber | 432.0 |
| Polyester resin | 406.0 |
| Styrene | 32.4 |
| Benzoyl peroxide | 8.8 |
| Zinc stearate | 9.6 |
| Asbestos | 600.0 |

Molded test parts from each of the compositions gave the following results:

|  | Mechanical Fiber | Extracted Fiber |
|---|---|---|
| Flexural Strength, p.s.i. | (¹) | 10,080 |
| Barcol Hardness | (¹) | 48 |
| Flow, inches | (¹) | 8³⁄₁₆ |
| Cure Time, seconds | (²) | 23 |
| Moisture Content, percent | 7.0 | 6.0 |

¹ Blistered and too soft for testing.
² Incomplete cure in 30 seconds.

It is readily evident that although mechanical fibers serve many useful markets at present, the mechanical process does not produce a fiber sufficiently free of encrustations and non-fibrous bark components to serve those areas such as polyester resin reinforcement where in variations in chemical constituents must be closely controlled.

Thus it is apparent that the present invention overcomes many of the economic and procedural disadvantages which heretofore have attended the production and use of tree bark bast fibers. In place of a complex series of mechanical operations, the present invention utilizes a simple chemical and mechanical procedure. In place of a relatively low yield of product, the present invention obtains a high yield. In place of a product characterized by property deficiencies, insofar as certain end uses are concerned, there is obtained a product which is well suited for such uses.

By a simple extraction of bark with an alkaline solution, the major portions of the parenchyma and cork components of the bark are effectively dissolved away, leaving the desired bast fibers and a minor residue of parenchyma tissue and artifacts of other components such as cork cell skeletons. In addition, this residual material associated with the fibers is rendered friable so that it may be easily removed by mechanical attrition. As a result there is obtained in usable form substantially all of the bast fiber content of the bark.

Having thus described our invention in preferred embodiments, we claim as new and desired to protect by Letters Patent:

1. The process which comprises:
   (a) providing small pieces of Douglas fir tree bark containing bast fibers encrusted with adherent material and embedded in parenchyma matrixes and having a native content of alkaline soluble materials;
   (b) treating the bark for a time within the range of 30 to 180 minutes and within the temperature range of 60° F. to 212° F. with an aqueous alkaline treating agent having a pH in the range of 8 to 12 for removing a substantial proportion of the alkaline soluble content and the encrusting material from the fibers and for rendering friable the associated matrix material;
   (c) drying the treated bark and subsequently separating particles having a size less than about 28 mesh Tyler Standard Sieve Series screen from the larger particles;
   (d) abrading the dried bark for reducing the friable associated matrix material and subsequently separating particles having a size less than about 40 mesh Tyler Standard Sieve Series screen from the larger particles; and
   (e) separating the resultant fibers from steps (c) and (d) having a size less than about 40 mesh Tyler Standard Sieve Series screen from the matrix material.

2. The process of claim 1 wherein the fiber is separated from the abraded matrix material by screening.

3. The process of claim 1 wherein the fiber is separated from the abraded matrix material by air separation.

4. The bark fiber product produced by the process of claim 1.

5. The process which comprises:
   (a) providing small pieces of Douglas fir bark containing bast fibers encrusted with adherent material and embedded in a parenchyma matrix and having a native content of alkaline soluble materials;
   (b) forming an extraction mixture comprising the bark and an aqueous solution of caustic soda used in amount sufficient to provide a caustic soda usage of from 5–25% by weight, a consistency of the bark of from 5–40% and a pH of from 8–12;
   (c) heating the reaction mixture to a temperature of from 140° F. to the boiling point and maintaining it at that temperature for a reaction time within the range of 30 to 180 minutes to render friable the parenchyma matrix around the fibers and for removing a predetermined proportion of the caustic soda soluble content of the fibers and the encrusting adherent material;
   (d) separating the treated bark from the liquor;
   (e) drying the separated bark;
   (f) abrading the dried separated bark to reduce the friable parenchyma matrix material to provide a —40 mesh Tyler Standard Sieve Series screen fraction; and
   (g) separating the fibers from the parenchyma matrix material.

6. The process which comprises:
   (a) providing small pieces of Douglas fir tree bark containing bast fibers encrusted with adherent material and embedded in parenchyma matrixes and having a native content of alkaline soluble materials;
   (b) treating the bark for a time within the range of 30 to 180 minutes with an aqueous alkaline treating agent having a pH in the range of 8 to 12 for removing a substantial proportion of the alkaline soluble content and the encrusting material from the fibers and for rendering friable the associated matrix material;
   (c) drying the treated bark;
   (d) abrading the dried bark by milling for reducing the friable associated matrix material;
   (e) screening the abraded material to provide a —40 mesh Tyler Standard Sieve Series screen fraction; and
   (f) separating the resultant fraction fibers by air separation into a fines fraction and a fiber fraction.

7. The process of claim 6 wherein the alkaline treating agent comprises caustic soda.

8. The process of claim 6 wherein the treated bark is dried to a moisture content of less than 30% by weight.

References Cited by the Examiner

UNITED STATES PATENTS

| | | | |
|---|---|---|---|
| 1,182,697 | 5/1916 | Margolius | 162—93 X |
| 2,698,233 | 12/1954 | Lewis | 162—93 |
| 2,926,115 | 2/1960 | Van Beckum | 162—93 |

FOREIGN PATENTS

| | | |
|---|---|---|
| 12,443 | 3/1928 | Australia. |
| 289,676 | 5/1928 | Great Britain. |

OTHER REFERENCES

Lewis (II): Utilization of Redwood Bark, Paper Trade Journal, pp. 18, 19, 20, 22, Apr. 6, 1950.

DONALL H. SYLVESTER, *Primary Examiner.*

MORRIS O. WOLK, *Examiner.*